United States Patent
Kwak et al.

(10) Patent No.: US 7,697,954 B2
(45) Date of Patent: Apr. 13, 2010

(54) METHOD AND APPARATUS FOR SIGNALING MAXIMUM UE TRANSMITTER POWER INFORMATION TO BASE STATION FOR SCHEDULING OF UPLINK PACKET TRANSMISSION IN A MOBILE COMMUNICATION SYSTEM

(75) Inventors: Yong-Jun Kwak, Yongin-si (KR); Sung-Ho Choi, Suwon-si (KR); Ju-Ho Lee, Suwon-si (KR); Youn-Hyoung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 822 days.

(21) Appl. No.: 11/391,730

(22) Filed: Mar. 29, 2006

(65) Prior Publication Data
US 2006/0286994 A1 Dec. 21, 2006

(30) Foreign Application Priority Data
Mar. 29, 2005 (KR) .................. 10-2005-0025893

(51) Int. Cl.
*H04B 7/00* (2006.01)
(52) U.S. Cl. ........................ 455/522; 370/318
(58) Field of Classification Search ........... 455/450, 455/464, 13.4, 522, 127.1; 370/318
See application file for complete search history.

(56) References Cited

U.S. PATENT DOCUMENTS

| 5,991,618 A | 11/1999 | Hall |
| 2004/0198369 A1 | 10/2004 | Kwak et al. |
| 2005/0163056 A1* | 7/2005 | Ranta-Aho et al. .......... 370/252 |

FOREIGN PATENT DOCUMENTS

| KR | 10-2005-0021083 A | 3/2005 |
| RU | 2208913 C2 | 7/2003 |
| RU | 2236757 C2 | 9/2004 |
| WO | WO 01/47146 A1 | 6/2001 |

* cited by examiner

*Primary Examiner*—Rafael Pérez-Gutiérrez
*Assistant Examiner*—Marcos Batista
(74) *Attorney, Agent, or Firm*—Roylance, Abrams, Berdo & Goodman, L.L.P.

(57) ABSTRACT

A method and apparatus are provided for signaling a maximum UE transmitter power to a Node B for use in scheduling of uplink packet transmission in a mobile communication system. The Node B receives uplink channel status information from a UE and a maximum UE transmitter power from an RNC. The maximum UE transmitter power is the lower of the maximum allowed UL Tx power and the maximum Tx power of the UE. The Node B then schedules uplink packet transmission from the UE based on the uplink channel status information and the maximum UE transmitter power.

22 Claims, 9 Drawing Sheets

METHOD AND APPARATUS FOR SIGNALING MAXIMUM UE TRANSMITTER POWER INFORMATION TO BASE STATION FOR SCHEDULING OF UPLINK PACKET TRANSMISSION IN A MOBILE COMMUNICATION SYSTEM

CROSS-REFERENCE TO RELATED APPLICATIONS

This application claims the benefit under 35 U.S.C. §119 (a) of Korean Patent Application No. 10-2005-0025893, entitled "Method and Apparatus for Signaling Maximum UE Transmitter Power Information to Base Station For Scheduling of Uplink Packet Transmission in a Mobile Communication System", filed in the Korean Intellectual Property Office on Mar. 29, 2005, the entire disclosure of which is herein incorporated by reference.

BACKGROUND OF THE INVENTION

1. Field of the Invention

The present invention relates generally to a mobile communication system for supporting an enhanced uplink dedicated transport channel service. In particular, the present invention relates to a method and apparatus for scheduling uplink packet transmissions from User Equipments (UEs) based on information received from a Serving Radio Network Controller (SRNC) in a Node B.

2. Description of the Related Art

An asynchronous Wideband Code Division Multiple Access (WCDMA) communication system uses an Enhanced Uplink Dedicated CHannel (E-DCH). The E-DCH was designed to improve the performance of uplink packet transmission in the WCDMA communication system. New techniques have been introduced to the E-DCH transmission, including Adaptive Modulation and Coding (AMC), Hybrid Automatic Repeat reQuest (HARQ), and shorter Transmission Time Interval (TTI). AMC and HARQ are existing schemes adopted for High Speed Downlink Packet Access (HSDPA). A TTI is a time unit in which one data block is carried on a physical channel. In HSDPA, a Node B (instead of a Radio Network Controller (RNC)), is responsible for uplink scheduling as well as downlink scheduling. Accordingly, the uplink Node B-controlled scheduling differs from the downlink Node B-controlled scheduling.

FIG. 1 illustrates uplink packet transmission on the E-DCH in a typical mobile communication system.

Referring to FIG. 1, reference numeral 100 denotes a Node B supporting the E-DCH service and reference numerals 101 to 104 denote UEs using the E-DCH. The Node B 100 schedules E-DCHs for the UEs 101 to 104 based on their channel conditions. The scheduling is carried out such that a lower rate is allocated to a UE that is remote from the Node B 100, and a higher rate is allocated to a nearby UE to avoid a noise rise measurement at the Node B 100 exceeding a target noise rise.

FIG. 2 is a diagram illustrating a signal flow for a typical E-DCH transmission and reception procedure between a UE 202 and a serving Node B 201.

Referring to FIG. 2, the Node B 201 and the UE 202 set up an F-DCH between them in step 203. Step 203 involves message transmissions on dedicated transport channels. The UE 202 transmits scheduling information to the Node B 201 in step 204. The scheduling information may contain the transmit (Tx) power, the Tx power margin, or the amount of buffered transmission data of the UE 202. The uplink channel status of the UE 202 can be estimated from the Tx power and the Tx power margin.

In step 211, the Node B 201 monitors scheduling information from a plurality of UEs to schedule uplink data transmissions from the individual UEs. How the scheduling is performed may vary with the Node B 201, which will be described in greater detail below. If the Node B 201 decides to approve an uplink packet transmission from the UE 202, it transmits scheduling assignment information, i.e. a scheduling grant to the UE 202 in step 205.

In step 212, the UE 202 determines the Transport Format (TF) of the E-DCH based on the scheduling assignment information. The UE 202 then transmits control information about the E-DCH and E-DCH data to the Node B 201 at a data rate and a transmission timing determined according to the scheduling assignment information in steps 206 and 207.

The Node B 200 checks for errors in the E-DCH control information and the E-DCH data in step 213. In the presence of errors in either of the E-DCH control information and the E-DCH data, the Node B 201 transmits a Negative ACKnowledgement (NACK) signal to the UE 202 on an ACK/NACK channel, whereas in the absence of errors in both, the Node B 201 transmits an ACK signal to the UE 202 on the ACK/NACK channel in step 208.

The Node B 201 determines a data rate for the UE 202 by scheduling based on the scheduling information received in step 204. The Node B 201 must allocate appropriate data rates and transmission timings to the plurality of UEs. For this purpose, the Node B 201 allocates resources to the UEs by performing scheduling such that uplink Rise over Thermal (RoT) at the Node B 201 does not exceed a target RoT. Accordingly, more resources are allocated to a UE in a good channel condition in order to improve overall system performance.

Now a description will be made of a procedure for scheduling E-DCH transmissions from UEs in the Node B. As stated above, the Node B 201 performs scheduling such that the RoT of the Node B 201 does not exceed the target RoT and such that capacity is maximized as well. The scheduling is based on the scheduling information received from the UEs in step 204 of FIG. 2. The scheduling information is signaled to the Node B 201 as follows.

One method of signaling the scheduling information comprises steps such that each UE signals its Tx power to the Node B 201. The UE may additionally signal a queue size indicating the amount of data buffered in its buffer. The Node B 201 estimates the uplink channel status of the UE from the Tx power, to thereby allocate appropriate resources to the UE.

This signaling method will now be described in greater detail with reference to FIG. 1. The UEs 101 to 104 are separated from the Node B 100 by different distances. The UE 101 is nearest and the UE 104 is farthest. Thus, the UE 101 transmits an uplink channel at the weakest power level, whereas the UE 104 transmits an uplink channel at the strongest power level. Accordingly, to achieve the highest performance under the same RoT measurement, scheduling is done so that power is inversely proportional to data rate. That is, the Node B 100 schedules uplink data transmission in the manner that allocates a higher data rate to the nearest UE 101 with the lowest transmit power, and a lower data rate to the farthest UE 104 with the highest transmit power.

The above-described scheduling is called maximum Channel-to-Interference (C/I) scheduling. However, if each UE signals channel information only, the Node B may lose flexibility in scheduling due to the absence of information about the Tx power margin of the UE.

Even though many resources are allocated to a UE in a good uplink channel status, if the UE does not have a sufficient power margin, it cannot utilize the allocated resources fully. For example, since the UE 101 is near to the Node B 100 and thus can transmit data at a low transmit power level, the Node B 100 can allocate a relatively high data rate to the UE 101. Yet, if the UE 101 does not have a sufficient transmit power margin, full utilization of the allocated resources is impossible. That is, because the Node B 100 has no knowledge of the available Tx power margin of the UE 101, it cannot make an effective decision as to how many resources are to be allocated to the UE 101.

Another method of signaling the scheduling information comprises steps to signal the Tx power margin of the UE as the scheduling information. After receiving Tx power margins from a plurality of UEs, the Node B allocates resources to the UEs by scheduling based on the Tx power margins in the manner that increases cell performance.

This signaling method also has a distinctive drawback in that the Node B cannot accurately estimate the channel condition of each UE. The uplink channel status of the UE cannot be derived accurately from the Tx power margin information only. As a consequence, the C/I scheduling scheme based on channel condition is not viable.

For instance, when the UEs 101 to 104 signal their Tx power margins to the Node B 100, the Node B 100 allocates more resources to a UE having a greater Tx power margin, and less resources to a UE having a smaller Tx power margin. However, when a UE has a sufficient transmit power margin but is placed in a bad channel condition, the Node B does not actually allocate as many resources as corresponding to the Tx power margin. Even if the Node B does allocate such resources, the bad channel condition leads to failed data transmission and reception, thereby decreasing channel capacity.

Accordingly, a need exists for a system and method for effectively and efficiently signaling UE information for use in uplink packet transmission in a mobile communication system.

SUMMARY OF THE INVENTION

An object of embodiments of the present invention is to substantially solve at least the above problems and/or disadvantages and to provide at least the advantages described below. Accordingly, embodiments of the present invention provide a method and apparatus for signaling the total available Tx power of its E-DCH by each E-DCH-supporting UE.

According to one aspect of embodiments of the present invention, a method is provided for scheduling an uplink data service in a mobile communication system supporting the uplink data service. The method comprises a step in which a Node B receives one of a Tx power and a Tx power margin from a UE. The Tx power and the Tx power margin comprise uplink channel status information of the UE. The method further comprises a step in which the Node B receives a maximum UE transmitter power from an RNC. The maximum UE transmitter power comprises the lower of a maximum allowed UL Tx power determined for the UE by the RNC and a maximum Tx power corresponding to a power class of the UE. The method further comprises a step in which the Node B schedules uplink packet transmission from the UE based on the uplink channel status information and the maximum UE transmitter power.

According to another aspect of embodiments of the present invention, a method is provided for scheduling an uplink data service in an RNC in a mobile communication system supporting the uplink data service. The method comprises a step in which UE capability information including a maximum Tx power of a UE is received from the UE. The method further comprises steps in which it is determined whether a maximum allowed UL Tx power exists for the UE, and in the presence of the maximum allowed UL Tx power, the lower of the maximum allowed UL Tx power and the maximum Tx power is selected as a maximum UE transmitter power for the UE, and the maximum UE transmitter power is signaled to a Node B communicating with the UE.

According to another aspect of embodiments of the present invention, a method is provided for scheduling an uplink data service in a mobile communication system supporting the uplink data service. The method comprises a step in which a UE signals one of its Tx power and its Tx power margin, and the amount of buffered data to be transmitted, to a Node B. The Tx power and the Tx power margin comprise uplink channel status information of the UE. The method further comprises steps in which the UE receives a scheduling grant from the Node B, wherein the scheduling grant is determined by the Node B based on a maximum UE transmitter power, and the Tx power or the Tx power margin, and the maximum UE transmitter power is selected to be the lower of a maximum allowed UL Tx power and a maximum Tx power corresponding to a power class of the UE by the RNC. The method still further comprises a step in which the UE transmits uplink data to the Node B according to the scheduling grant.

According to still another aspect of embodiments of the present invention, an apparatus is provided for scheduling an uplink high-speed packet data service in a mobile communication system supporting uplink data service. The apparatus comprises an RNC for receiving UE capability information including a maximum Tx power of a UE from the UE, determining whether a maximum allowed UL Tx power exists for the UE, and selecting the lower of the maximum allowed UL Tx power and the maximum Tx power as a maximum UE transmitter power for the UE, in the presence of the maximum allowed UL Tx power. The apparatus further comprises a Node B for receiving one of a Tx power and a Tx power margin from the UE. The Tx power and the Tx power margin comprise uplink channel status information of the UE. The Node B receives the maximum UE transmitter power from the RNC, and schedules uplink packet transmission from the UE based on the uplink channel status information and the maximum UE transmitter power.

According to yet another aspect of embodiments of the present invention, an apparatus is provided for scheduling an uplink data service in a UE in a mobile communication system supporting the uplink data service. The apparatus comprises a scheduling information transmitter for signaling one of a Tx power and a Tx power margin, and the amount of buffered data to be transmitted to a Node B. The Tx power and the Tx power margin comprise uplink channel status information of the UE. The apparatus further comprises a scheduling assignment information receiver for receiving a scheduling grant from the Node B. The scheduling grant is determined by the Node B based on a maximum UE transmitter power, and the Tx power or the Tx power margin, and the maximum UE transmitter power is selected to be the lower of a maximum allowed UL Tx power and a maximum Tx power corresponding to a power class of the UE by the RNC.

The apparatus still further comprises a controller for controlling transmission of uplink data to the Node B according to the scheduling grant.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

Embodiments of the present invention provide a system and method for optimal scheduling of UEs supporting the E-DCH. To do so, a Node B takes into account the Tx power margins and Tx powers of the UEs. In addition to the method for direct transmission of the scheduling information from the UEs to the Node B on physical channels, the following exemplary methods can be used for efficiently signaling the scheduling information according to embodiments of the present invention.

Tx power (Tx(power)) and Tx power margin (Tx(margin)) representing uplink channel status information are typically in the relationship represented by the following Equation (1).

$$Tx(\text{power}) + Tx(\text{margin}) = \text{Maximum UE transmitter power} \quad (1)$$

According to Equation (1), a maximum UE transmitter power is the sum of a Tx power and a Tx power margin.

Hence if the Node B has knowledge of the maximum UE transmitter power of a UE, even though it receives only one of the Tx power and the Tx power margin from the UE, it can estimate the other information by using Equation (1), thereby enabling efficient scheduling.

As described above, the Node B allocates resources to UEs using the E-DCH through scheduling based on scheduling information received from the UEs. In this context, an exemplary method and apparatus can be provided for informing the Node B of the maximum UE transmitter power of a UE in accordance with embodiments of the present invention.

Two factors associated with the maximum UE transmitter power, i.e. maximum Tx power and maximum allowed UL Tx power, will be described in greater detail below.

Four Tx power classes are defined for the E-DCH depending on UE capability, as illustrated by way of example in Table 1 below.

TABLE 1

| Operating Band | Power Class 1 | | Power Class 2 | | Power Class 3 | | Power Class 4 | |
|---|---|---|---|---|---|---|---|---|
| | Power (dBm) | Tol (dB) | Power (dBm) | Tol (dB) | Power (dBm) | Tol (dB) | Power (dBm) | Tol (dB) |
| Band I | +33 | +1/−3 | +27 | +1/−3 | +24 | +1/−3 | +21 | +2/−2 |
| Band II | — | — | — | — | +24 | +1/−3 | +21 | +2/−2 |
| Band III | — | — | — | — | +24 | +1/−3 | +21 | +2/−2 |

Table 1 specifies maximum Tx powers and power error limits with which UEs can physically transmit data according to the power classes of the UEs. For a UE with Power Class 3, the maximum Tx power is +24 dBm, and the power error limit ranges from +1 dB to −3 dB. Operating Bands represent three WCDMA bands. The UE can report the maximum Tx power corresponding to its power class to an SRNC by Radio Resource Control (RRC) signaling.

Figure 1:
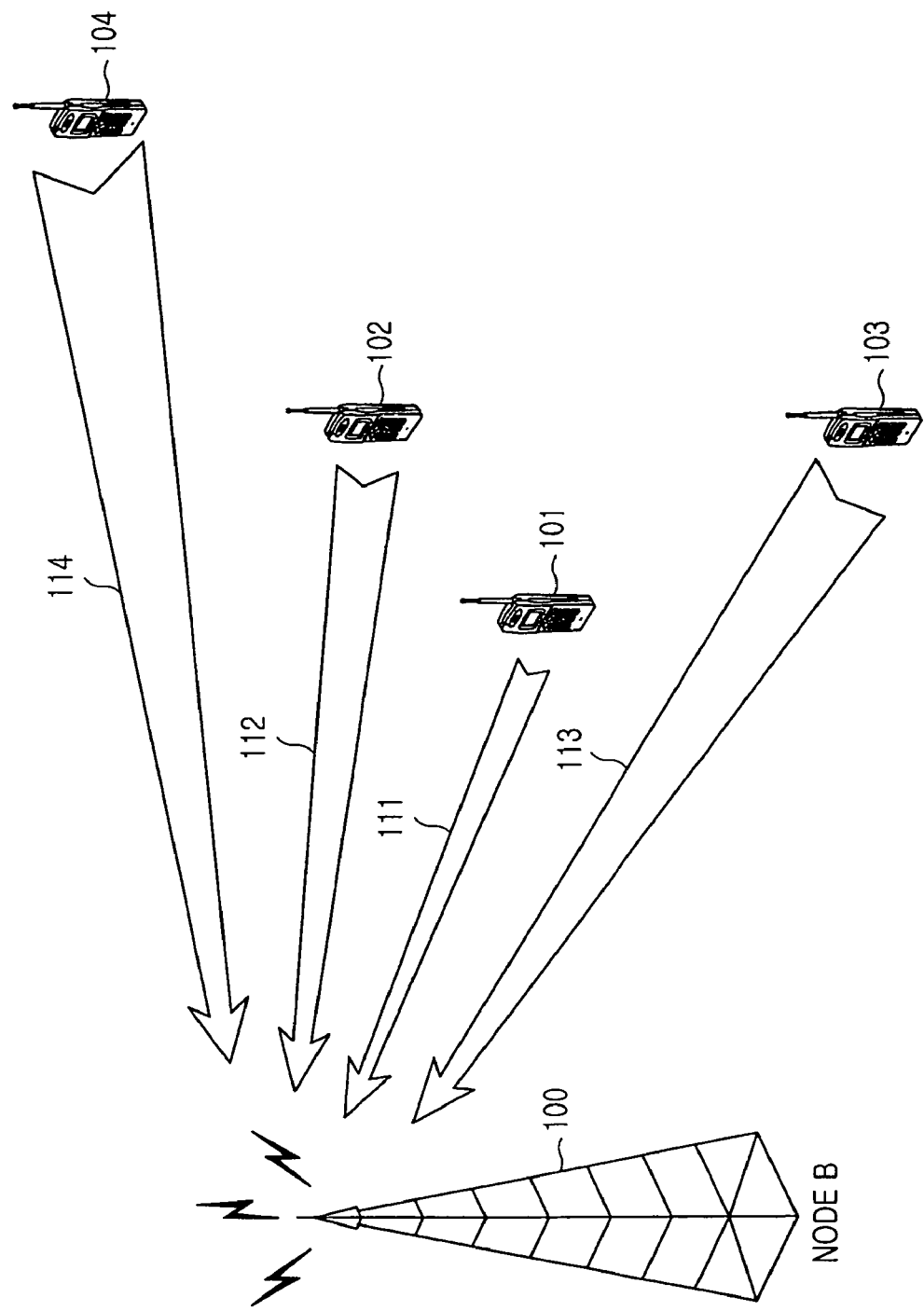
FIG. 1 illustrates uplink packet transmission on the E-DCH in a typical mobile communication system.
Figure 2:
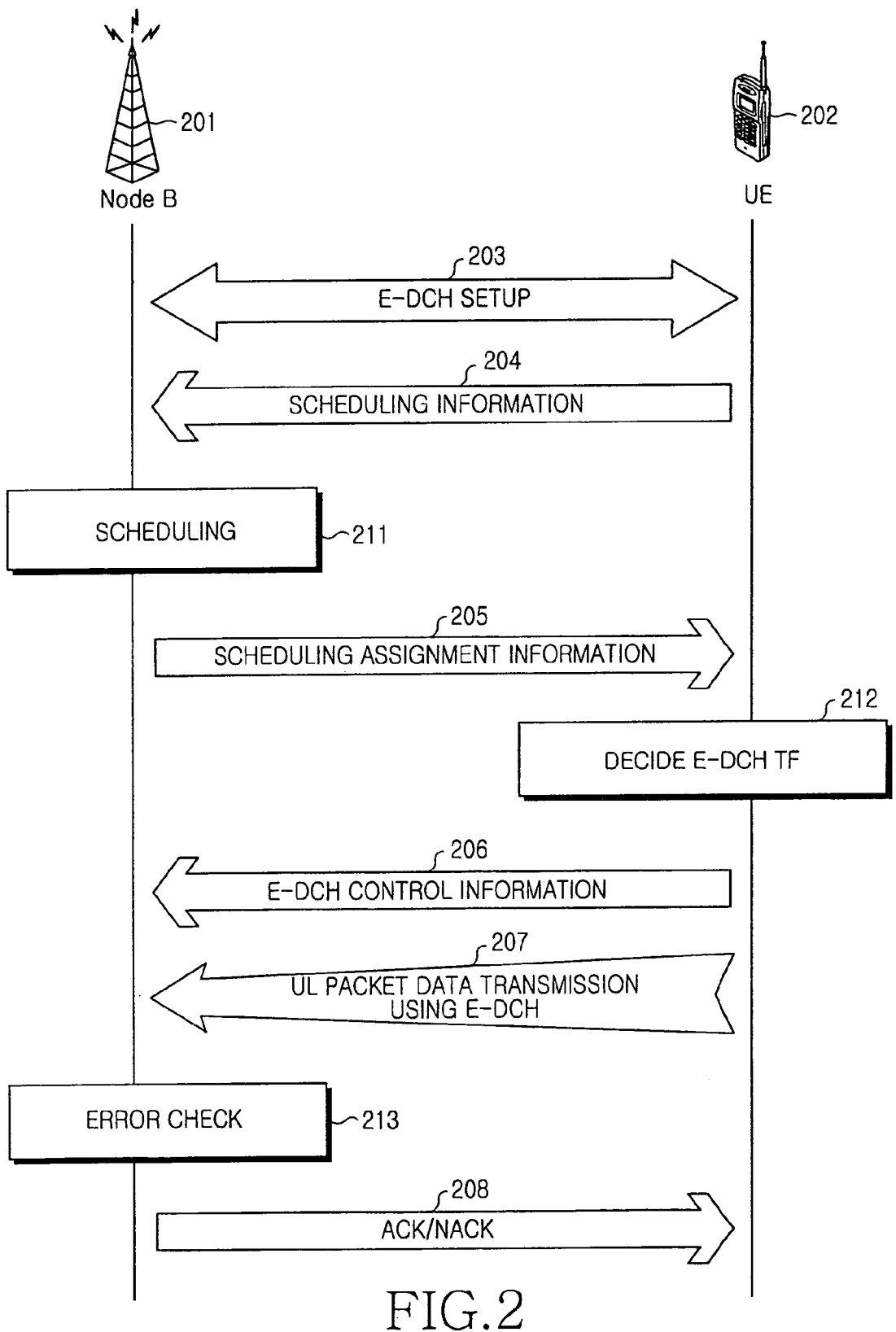
FIG. 2 is a diagram illustrating a signal flow for a typical E-DCH transmission and reception procedure.
Figure 3:
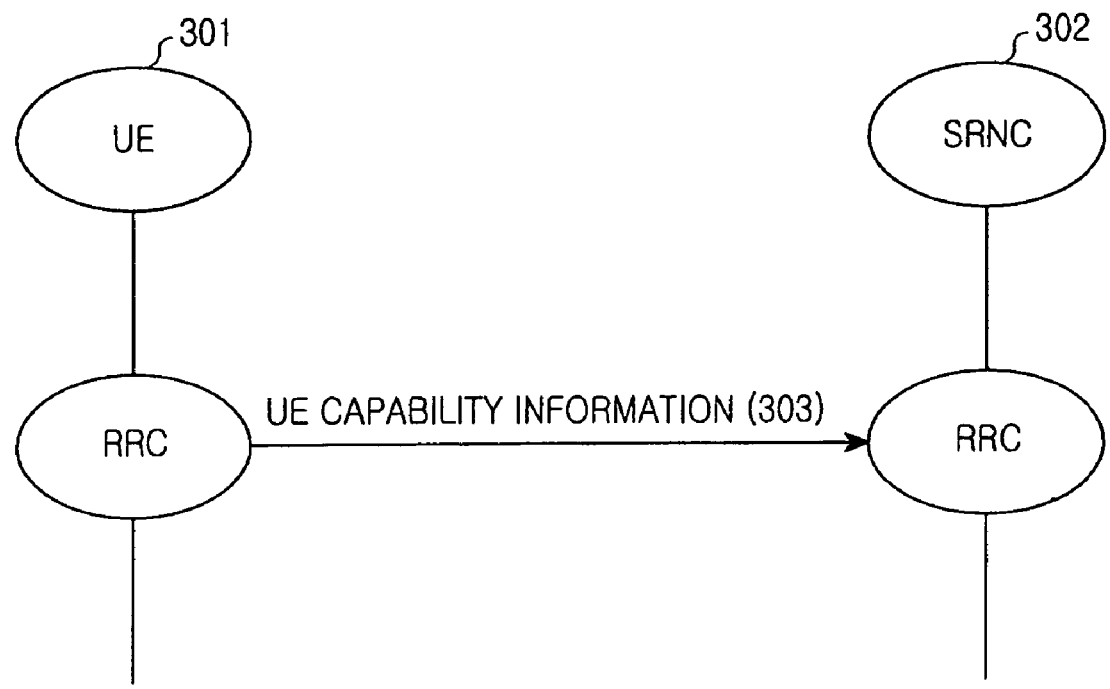
FIG. 3 is a diagram illustrating exemplary signaling of maximum Tx power information according to an embodiment of the present invention.

FIG. 3 is a diagram illustrating exemplary signaling of maximum Tx power information from the UE to the SRNC according to embodiments of the present invention.

Referring to FIG. 3, a UE 301 signals UE capability information 303 set as a physical value to an SRNC 302 by an RRC message. The UE capability information 303 comprises maximum Tx power information corresponding to the power class of the UE 301, but is not limited thereto.

The SRNC 302 restricts a maximum UL Tx power for every UE within the cell coverage of the Node B in order to efficiently manage the resources of the cell. This maximum UL Tx power is called maximum allowed UL Tx power and its range is given by way of example in Table 2 below.

TABLE 2

| Information Element | Need | Multi | Type and reference | Semantics description |
|---|---|---|---|---|
| Maximum allowed UL Tx power | MD | | Integer (−50 . . . 33) | In dBm |

Figure 4:
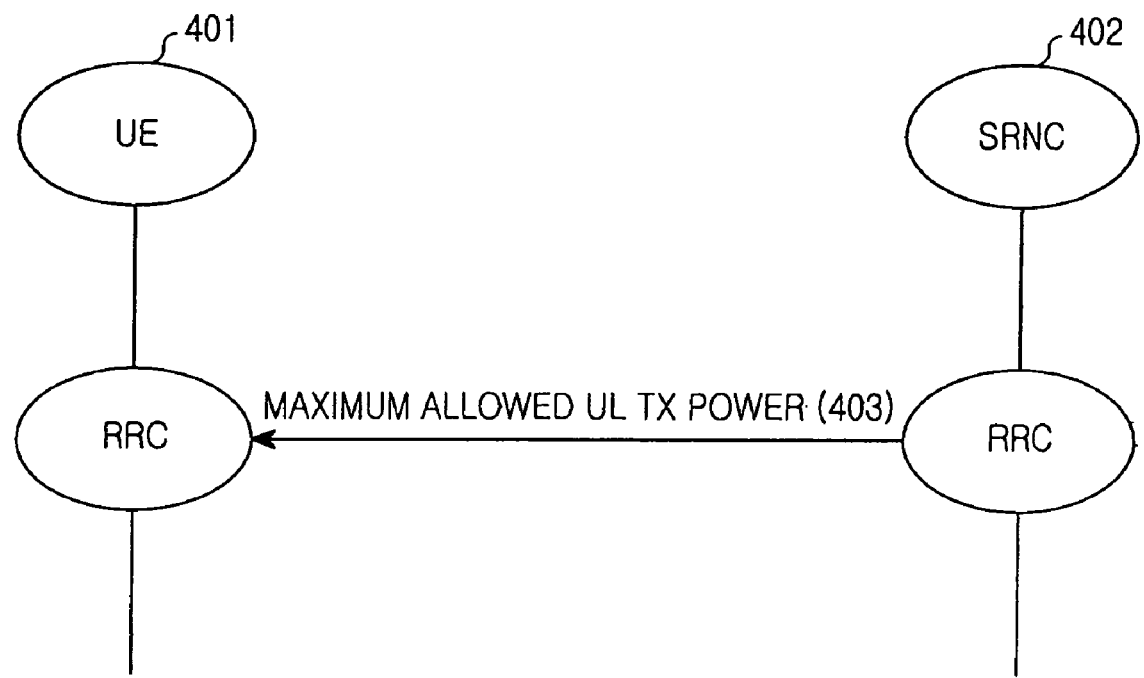
FIG. 4 is a diagram illustrating exemplary signaling of maximum allowed uplink (UL) Tx power information according to an embodiment of the present invention.

FIG. 4 is a diagram illustrating exemplary signaling of maximum allowed UL Tx power information from the SRNC to the UE according to an embodiment of the present invention.

Referring to FIG. 4, an SRNC 402 signals a maximum allowed UL Tx power 403 to a UE 401 by an RRC message. The RRC message comprises a System Information Block (SIB) or a dedicated message, but is not limited thereto.

In relation to the maximum UE transmitter power, the UE has knowledge of both the maximum Tx power corresponding to its power class and the maximum allowed UL Tx power signaled by the SRNC.

The maximum UE transmitter power available to the UE at a given time instant is the lower of the maximum Tx power and the maximum allowed UL Tx power as illustrated by Equation (2) below.

Maximum UE transmitter power=min(Maximum allowed UL Tx power, Maximum Tx power)  (2)

Accordingly, an embodiment of the present invention provides a method of enabling the Node B to determine the maximum Tx power available to the UE at a given time instant, i.e. the maximum UE transmitter power. The UE directly signals either its Tx power or Tx power margin to the Node B.

The SRNC informs the Node B of the maximum UE transmitter power of the UE by Node B Application Protocol (NBAP) signaling or in data payload on a user plane. Because the UE operates by selecting the lower of the maximum Tx power and the maximum allowed UL Tx power as the maximum UE transmitter power, the Node B does not need to receive information indicating the UE's selection from the SRNC, which might otherwise incur unnecessary overhead.

Therefore, the SRNC signals the maximum UE transmitter power being the lower of the maximum Tx power and the maximum allowed UL Tx power to the Node B in an embodiment of the present invention. Exemplary operation and signaling of the SRNC will be described in greater detail below with reference to first and second exemplary embodiments of the present invention.

First Exemplary Embodiment

In a first exemplary embodiment of the present invention, the RNC selects information required for the Node B between the maximum allowed UL Tx power and the maximum Tx power and signals the selected information to the Node B, and the UE transmits its Tx power margin to the Node B.

More specifically, the UE signals its Tx power margin to the Node B on a physical channel, and the RNC signals the maximum UE transmitter power to the Node B by NBAP signaling or in data payload on a user plane via an Iub connection. The maximum UE transmitter power is delivered by defining a new NBAP message for the E-DCH, or modifying an existing NBAP message. If a user-plane message is used, a change is incurred to the user plane correspondingly.

The RNC selects one of the maximum allowed UL Tx power and the maximum Tx power as the maximum UE transmitter power according to a predetermined criterion and signals the maximum UE transmitter power to the Node B by an NBAP message for the E-DCH or a user-plane message.

Figure 5:
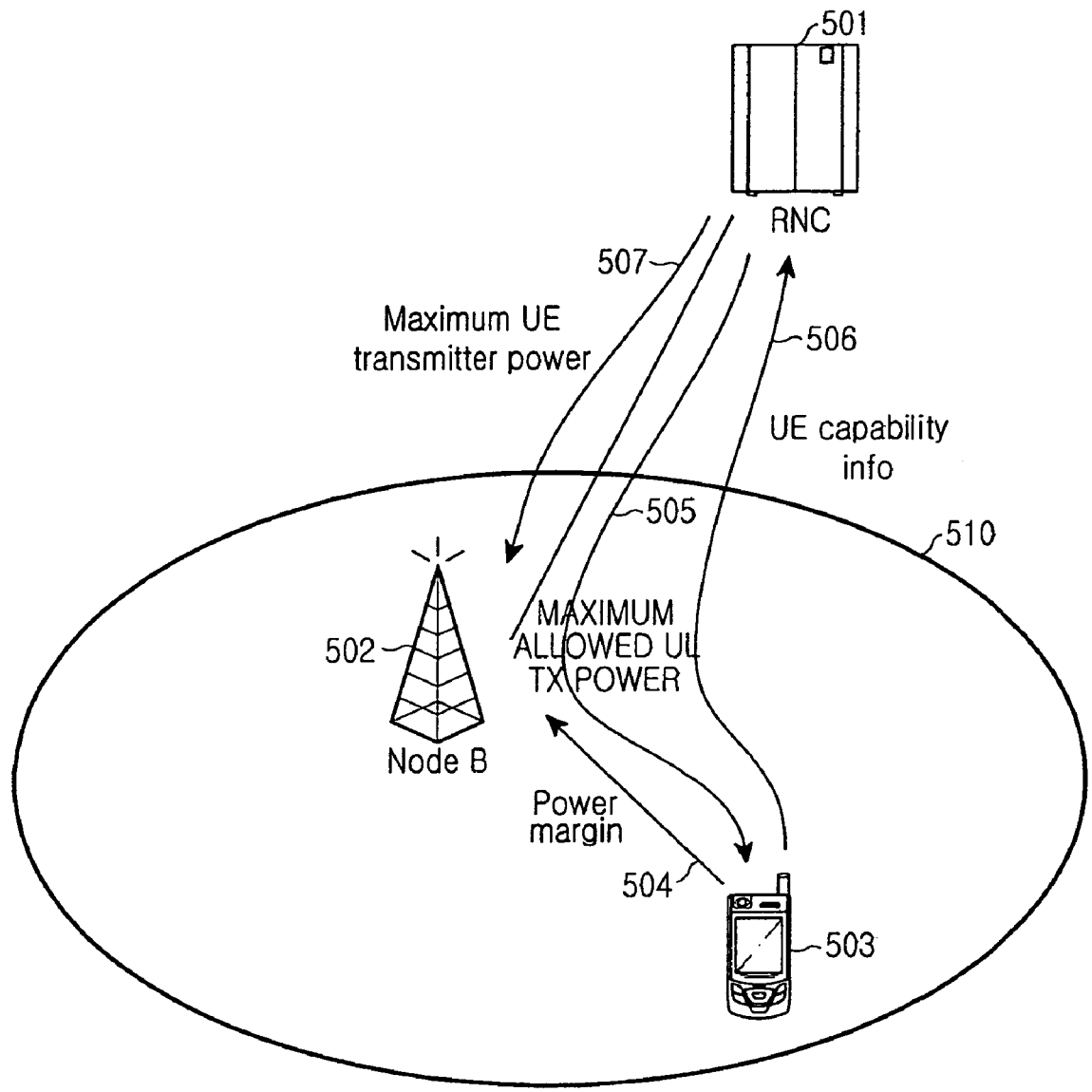
FIG. 5 illustrates an exemplary system configuration according to an embodiment of the present invention.

FIG. 5 illustrates signaling among the RNC, the Node B and the UE according to the first exemplary embodiment of the present invention.

Referring to FIG. 5, a UE 503 receives the E-DCH service and a RNC 501 receives UE capability information 506 from the UE 503 by an RRC message. The RNC 501 thus detects the type of the UE 503 from UE type information set in the UE capability information 506 and acquires the maximum Tx power of the UE 503 from UE power class information included in the UE type information.

The RNC 501 signals a maximum allowed UL Tx power 505 to the UE 503, and determines the maximum UE transmitter power of the UE 503 using the maximum Tx power and the maximum allowed UL Tx power.

When the E-DCH service starts, the RNC 501 signals the maximum UE transmitter power 507 to the Node B 502 by an NBAP message. During transmitting the E-DCH, the UE 503 signals its Tx power margin 504 to the Node B 502 periodically on a physical channel. Thus, by receiving knowledge of the maximum UE transmitter power 507 and the Tx power margin 504, the Node B 502 can calculate the Tx power of the UE 503 by using Equation (1). In this way, the Node B 502 acquires both the Tx power and the Tx power margin as the uplink channel information of the UE 503 and thus performs more efficient, optimal scheduling.

Figure 6:
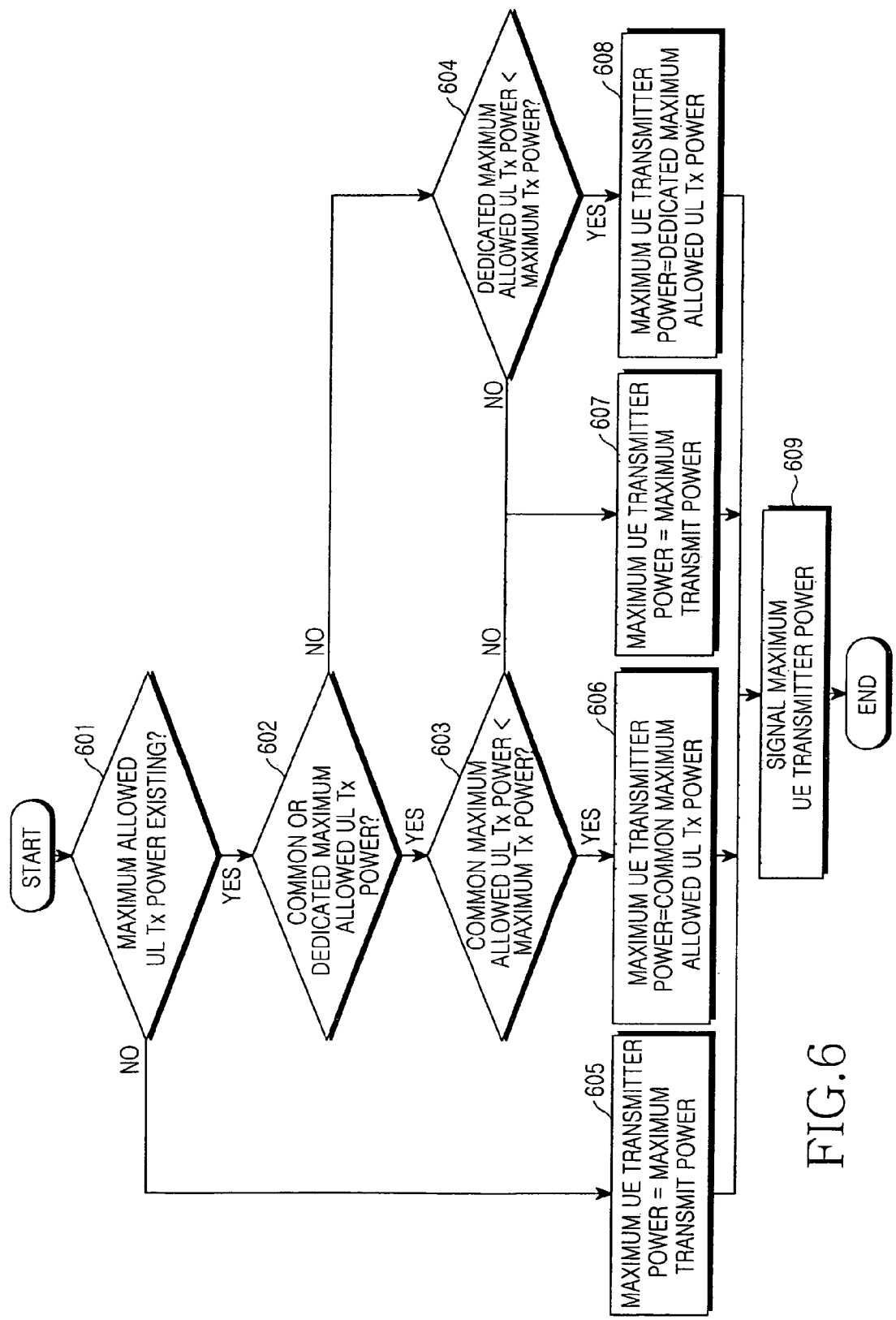
FIG. 6 is a flowchart illustrating an exemplary operation of a Serving Radio Network Controller (SRNC) according to an embodiment of the present invention.

FIG. 6 is a flowchart illustrating an exemplary operation for determining the maximum UE transmitter power to be included in an NBAP message in the SRNC according to an embodiment of the present invention.

The SRNC makes a decision as to which one to select between the maximum allowed UL Tx power and the maximum Tx power as the maximum UE transmitter power. The maximum allowed UL Tx power can be common to all UEs within a cell or dedicated to a particular UE.

Referring to FIG. 6, the RNC determines whether a maximum allowed UL Tx power already exists for the UE in step 601. In the absence of the maximum allowed UL Tx power, the RNC sets the maximum UE transmitter power of the UE to the maximum Tx power corresponding to the power class of the UE, received from the UE, in step 605.

In the presence of the maximum allowed UL Tx power, the RNC determines whether the maximum allowed UL Tx power is common information or dedicated information in step 602. Steps 601 and 602 are typical operations beyond the scope of embodiments of the present invention.

If the maximum allowed UL Tx power is common information, the SRNC compares the common maximum allowed UL Tx power with the maximum Tx power in step 603. If the common maximum allowed UL Tx power is less than the maximum Tx power, the RNC sets the maximum UE transmitter power to the common maximum allowed UL Tx power in step 606.

If the common maximum allowed UL Tx power is equal to or greater than the maximum Tx power, the SRNC sets the maximum UE transmitter power to the maximum Tx power in step 607.

If the maximum allowed UL Tx power is dedicated information in step 602, the SRNC compares the dedicated maximum allowed UL Tx power with the maximum Tx power in step 604. If the dedicated maximum allowed UL Tx power is less than the maximum Tx power, the RNC sets the maximum UE transmitter power to the dedicated maximum allowed UL Tx power in step 608. If the dedicated maximum allowed UL Tx power is equal to or greater than the maximum Tx power, the SRNC sets the maximum UE transmitter power to the maximum Tx power in step 607.

After setting the maximum UE transmitter power in steps 605 to 608, the RNC signals the maximum UE transmitter power to the Node B by an NBAP message or a user-plane message in step 609.

Second Exemplary Embodiment

In a second exemplary embodiment of the present invention, the RNC selects information required for the Node B between the maximum allowed UL Tx power and the maximum Tx power and signals the selected information to the Node B, and the UE transmits its Tx power to the Node B.

More specifically, the UE signals its Tx power to the Node B on a physical channel, and the RNC signals the maximum UE transmitter power to the Node B by NBAP signaling via an Iub connection. The maximum UE transmitter power is set in a new NBAP message defined for the E-DCH, or in a modified one of an existing NBAP message.

The RNC selects one of the maximum allowed UL Tx power and the maximum Tx power as the maximum UE transmitter power according to a predetermined criterion and signals the maximum UE transmitter power to the Node B by an NBAP message for the E-DCH or a user-plane message.

Figure 7:
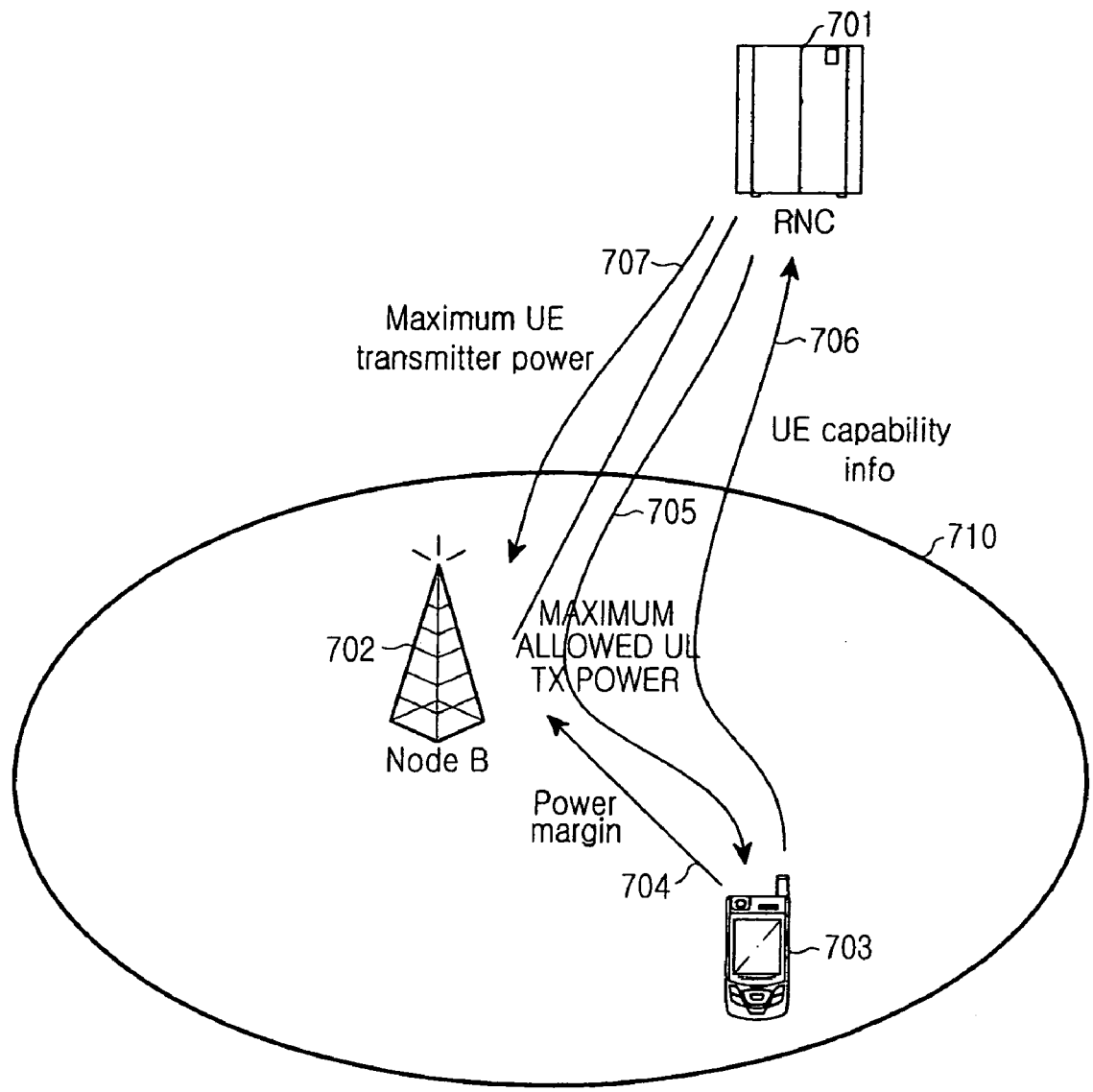
FIG. 7 illustrates an exemplary system configuration according to another embodiment of the present invention.

FIG. 7 illustrates signaling among the RNC, the Node B and the UE according to the second exemplary embodiment of the present invention.

Referring to FIG. 7, a UE 703 receives the E-DCH service and an RNC 701 receives UE capability information 706 from the UE 703. The RNC 701 thus detects the type of the UE 703 from UE type information set in the UE capability information and also acquires the maximum Tx power of the UE 703 from UE power class information included in the UE type information.

The SRNC 701 signals a maximum allowed UL Tx power 705 to the UE 703, and determines the maximum UE transmitter power of the UE 703 using the maximum Tx power and the maximum allowed UL Tx power.

When the E-DCH service starts, the SRNC 701 signals the maximum UE transmitter power to the Node B 702 by an NBAP message 707. During transmitting the E-DCH, the UE 703 signals its Tx power 704 to the Node B 702 periodically on a physical channel. Thus, by receiving knowledge of the maximum UE transmitter power 707 and the Tx power 704, the Node B 702 can calculate the Tx power margin of the UE 703 by using Equation (1).

In this way, the Node B 702 acquires both the Tx power and the Tx power margin and thus performs more efficient, optimal scheduling. The operation for determining the maximum UE transmitter power to be included in an NBAP message in the RNC is performed in substantially the same manner as illustrated in FIG. 6 and thus further description is not provided.

Figure 8:
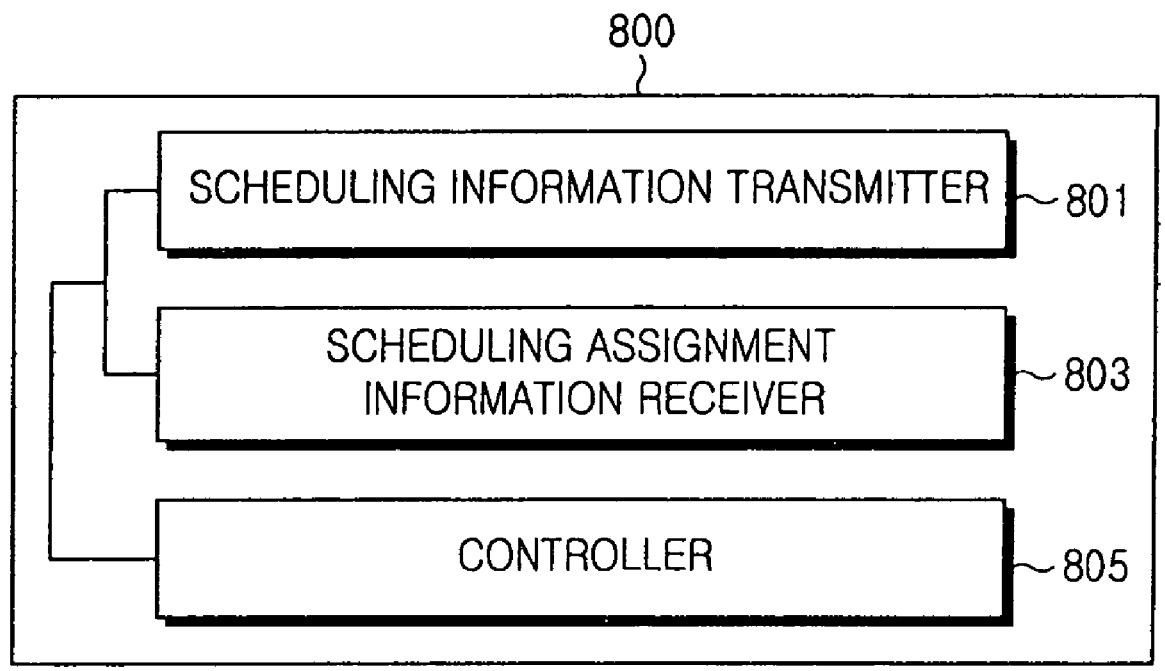
FIG. 8 is a block diagram of an exemplary UE according to embodiments of the present invention.

FIG. 8 is a block diagram of an exemplary UE according to embodiments of the present invention.

Referring to FIG. 8, a UE 800 comprises a scheduling information transmitter 801 for transmitting scheduling information to a Node B, a scheduling assignment information receiver 803 for receiving scheduling information from the Node B, and a controller 805.

The scheduling information transmitter 801 signals at least one of a Tx power and a Tx power margin from which the uplink channel status of the UE can be derived, and the amount of buffered data to be transmitted to the Node B.

The Node B determines a scheduling grant (i.e. scheduling assignment information) indicating a data rate and transmission timing for the UE 800 based on a maximum UE transmitter power signaled by the SRNC in accordance with the procedure of FIG. 7, and the Tx power or Tx power margin received from the UE 800, and transmits the scheduling grant to the scheduling assignment information receiver 803 of the UE 800.

The scheduling assignment information receiver 803 provides the scheduling assignment information to the controller 805. The controller 805 transmits E-DCH data based on the data rate and transmission timing acquired from the scheduling assignment information.

Figure 9:
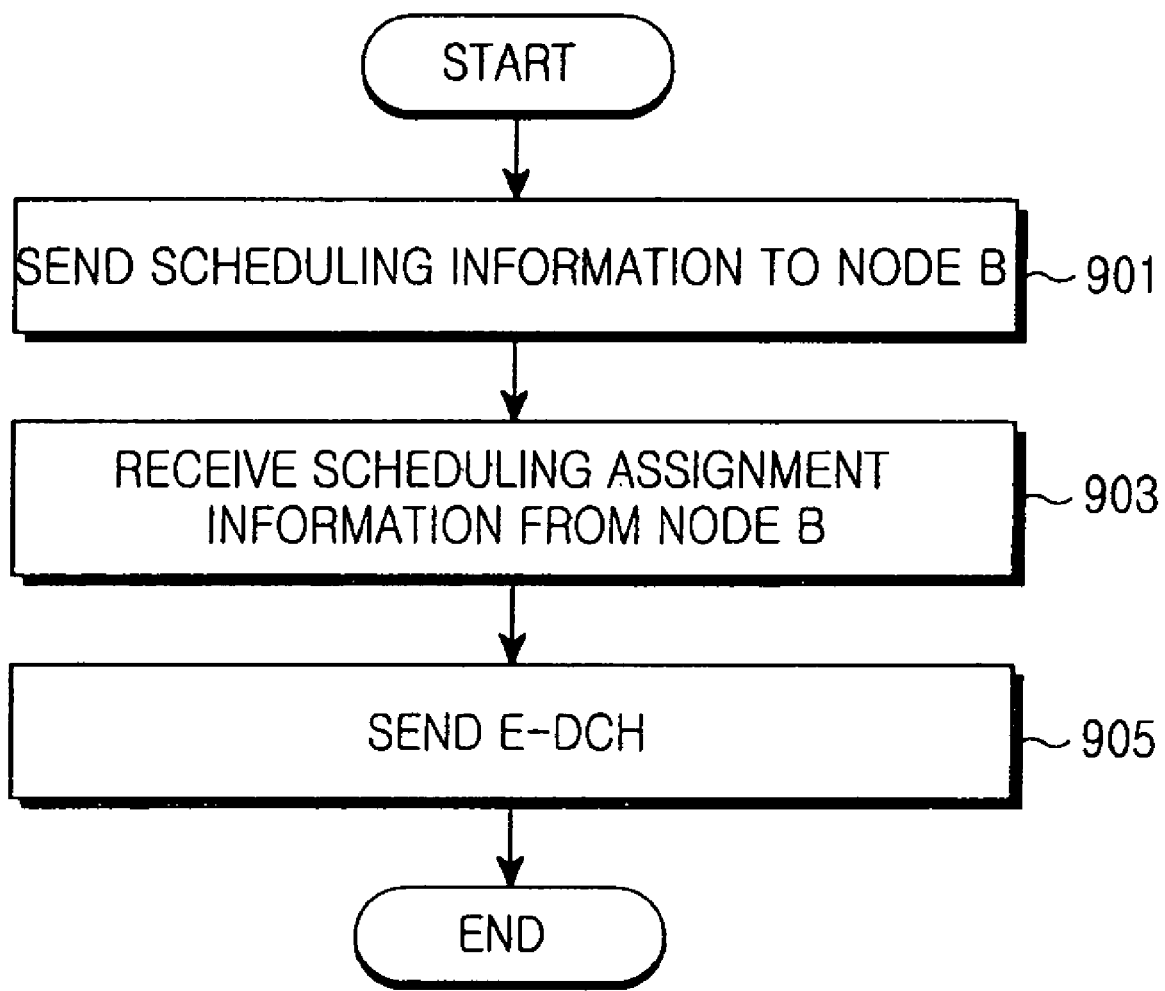
FIG. 9 is a flowchart illustrating an exemplary operation of the UE according to embodiments of the present invention.

FIG. 9 is a flowchart illustrating an exemplary operation of the UE according to embodiments of the present invention.

Referring to FIG. 9, the UE signals at least one of a Tx power and a Tx power margin from which the uplink channel status of the UE can be derived, and the amount of buffered data to be transmitted, to the Node B in step 901.

In step 903, the UE receives scheduling assignment information from the Node B. The Node B determines the scheduling assignment information indicating a data rate and transmission timing for the UE according to a maximum UE transmitter power determined by the SRNC and the Tx power or Tx power margin received from the UE.

The UE transmits E-DCH data based on the data rate and the transmission timing in step 905.

Embodiments of the present invention as described above provide a number of benefits, including for example, the following major effects.

Information associated with Node B-controlled scheduling is effectively signaled among a UE, a Node B and an RNC in a mobile communication system supporting the E-DCH. Therefore, the Node B-controlled scheduling becomes more efficient and optimized, and thus the overall system performance is increased.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of scheduling an uplink data service in a mobile communication system supporting the uplink data service, comprising the steps of:
   receiving scheduling information for uplink packet transmission from a user equipment (UE) by a Node B;
   receiving a maximum UE transmitter power from a radio network controller (RNC) by the Node B, the maximum UE transmitter power comprising a lower of a maximum allowed uplink (UL) Tx power determined for the UE by the RNC and a maximum Tx power corresponding to a power class of the UE; and
   scheduling the uplink packet transmission for the UE based on the received scheduling information and the maximum UE transmitter power by the Node B.

2. The method of claim 1, wherein the scheduling information consists of at least one of the Tx power or the Tx power margin or amount of buffered transmission data of the UE.

3. The method of claim 2, further comprising the step of:
   determining the Tx power or the Tx power margin not received from the UE by subtracting the Tx power or the Tx power margin received from the UE from the maximum UE transmitter power.

4. The method of claim 2, further comprising the steps of:
   receiving UE capability information comprising the maximum Tx power of the UE from the UE by the RNC;
   determining whether the maximum allowed UL Tx power exists for the UE by the RNC;
   comparing the maximum allowed UL Tx power with the maximum Tx power by the RNC if the maximum allowed UL Tx power exists; and
   selecting the lower of the maximum allowed UL Tx power and the maximum Tx power as the maximum UE transmitter power by the RNC.

5. The method of claim 4, wherein the maximum allowed UL Tx power comprises common information or dedicated information.

6. The method of claim 4, further comprising the step of:
   setting the maximum UE transmitter power to the maximum Tx power by the RNC if the maximum allowed UL Tx power does not exist.

7. A method of scheduling an uplink data service in a radio network controller (RNC) in a mobile communication system supporting the uplink data service, comprising the steps of:
   receiving user equipment (UE) capability information comprising a maximum Tx power of a UE from the UE;

determining whether a maximum allowed uplink (UL) transmit (Tx) power exists for the UE; and selecting the lower of the maximum allowed UL Tx power and the maximum Tx power as a maximum UE transmitter power for the UE if the maximum allowed UL Tx power exists, and signaling the maximum UE transmitter power to a Node B communicating with the UE.

8. The method of claim 7, wherein the maximum allowed UL Tx power comprises common information or dedicated information.

9. The method of claim 7, further comprising the step of:
setting the maximum UE transmitter power to the maximum Tx power if the maximum allowed UL Tx power does not exist.

10. A method of scheduling an uplink data service in a mobile communication system supporting the uplink data service, comprising the steps of:
signaling scheduling information for uplink packet transmission to a Node B by a user equipment (UE);
receiving a scheduling grant from the Node B by the UE, the scheduling grant being determined by the Node B based on a maximum UE transmitter power, and the scheduling information, and the maximum UE transmitter power being selected to be the lower of a maximum allowed uplink (UL) Tx power and a maximum Tx power corresponding to a power class of the UE by a radio network controller (RNC); and
transmitting uplink data to the Node B according to the scheduling grant by the UE.

11. The method of claim 10, further comprising the steps of:
receiving UE capability information comprising the maximum Tx power from the UE by the RNC;
determining whether the maximum allowed UL Tx power exists for the UE by the RNC; and
selecting the lower of the maximum allowed UL Tx power and the maximum Tx power as the maximum UE transmitter power by the RNC if the maximum allowed UL Tx power exists, and signaling the maximum UE transmitter power to the Node B by the RNC.

12. The method of claim 11, wherein the maximum allowed UL Tx power comprises common information or dedicated information.

13. The method of claim 11, further comprising the step of:
setting the maximum UE transmitter power to the maximum Tx power by the RNC if the maximum allowed UL Tx power does not exist.

14. The method of claim 10, wherein the scheduling information consists of at least one of the Tx power or the Tx power margin or amount of buffered transmission data of the UE.

15. An apparatus for scheduling an uplink high-speed packet data service in a mobile communication system supporting uplink data service, comprising:
a radio network controller (RNC) for receiving user equipment (UE) capability information comprising a maximum transmit (Tx) power of a UE from the UE, determining whether a maximum allowed uplink (UL) Tx power exists for the UE, and selecting the lower of the maximum allowed UL Tx power and the maximum Tx power as a maximum UE transmitter power for the UE if the maximum allowed UL Tx power exists; and
a Node B for receiving scheduling information for uplink packet transmission from the UE, receiving the maximum UE transmitter power from the RNC, and scheduling the uplink packet transmission from the UE based on the scheduling information and the maximum UE transmitter power.

16. The apparatus of claim 15, wherein the scheduling information consists of at least one of the Tx power or the Tx power margin or amount of buffered transmission data of the UE.

17. The apparatus of claim 16, wherein the Node B is configured to determine the Tx power or the Tx power margin not received from the UE by subtracting the Tx power or the Tx power margin received from the UE from the maximum UE transmitter power.

18. The apparatus of claim 15, wherein the maximum allowed UL Tx power comprises common information or dedicated information.

19. The apparatus of claim 15, wherein the RNC is configured to set the maximum UE transmitter power to the maximum Tx power if the maximum allowed UL Tx power does not exist.

20. An apparatus for scheduling an uplink data service in a user equipment (UE) in a mobile communication system supporting the uplink data service, comprising:
a scheduling information transmitter for signaling scheduling information for uplink packet transmission to a Node B;
a scheduling assignment information receiver for receiving a scheduling grant from the Node B, the scheduling grant being determined by the Node B based on a maximum UE transmitter power, and the scheduling information, and the maximum UE transmitter power being selected to be the lower of a maximum allowed uplink (UL) Tx power and a maximum Tx power corresponding to a power class of the UE by a radio network controller (RNC); and
a controller for controlling transmission of uplink data to the Node B according to the scheduling grant.

21. The apparatus of claim 20, wherein the maximum allowed UL Tx power comprises common information or dedicated information.

22. The apparatus of claim 20, wherein the scheduling information consists of at least one of the Tx power or the Tx power margin or amount of buffered transmission data of the UE.

* * * * *